| United States Patent [19] | [11] Patent Number: 4,756,832 |
| --- | --- |
| Gold et al. | [45] Date of Patent: Jul. 12, 1988 |

[54] ENZYMATIC PROCESS

[75] Inventors: Kenneth Gold, Hastins-On-Hudson, N.Y.; Bruce W. Brodman, Stroudsburg, Pa.

[73] Assignee: The United States of America as represented by the Secretary of the Army, Washington, D.C.

[21] Appl. No.: 87,858

[22] Filed: Aug. 17, 1987

[51] Int. Cl.$^4$ .............................. C02F 1/58; C02F 3/34
[52] U.S. Cl. ..................................... 210/632; 210/903; 435/262; 435/874
[58] Field of Search ............... 210/606, 610, 611, 632, 210/903; 435/25–28, 262, 264, 267, 814, 874–877

[56] References Cited

U.S. PATENT DOCUMENTS

| 3,868,303 | 2/1975 | Tsumura et al. | 435/814 X |
| 3,897,308 | 7/1975 | Li et al. | 435/262 |
| 3,943,055 | 3/1976 | Korenkov et al. | 210/606 X |
| 3,994,780 | 11/1976 | Klass et al. | 210/606 X |
| 4,011,141 | 3/1977 | Gravely et al. | 435/267 X |
| 4,043,936 | 8/1977 | Francis et al. | 210/610 X |
| 4,288,545 | 9/1981 | Spraker | 210/632 X |
| 4,342,827 | 8/1982 | Atkinson et al. | 435/26 |
| 4,566,469 | 1/1986 | Semp et al. | 210/903 X |

*Primary Examiner*—Tom Wyse
*Attorney, Agent, or Firm*—Robert P. Gibson; Edward Goldberg; Edward F. Costigan

[57] ABSTRACT

This invention is an improved enzymatic process for the removal of nitrite ions from an aqueous solution resulting from the denitration of a nitrate ester. The aqueous solution is treated with an enzyme nitrite reductase resulting from inducement under facultative anaerobic conditions of pseudomonas sp.

6 Claims, No Drawings

ENZYMATIC PROCESS

STATEMENT OF GOVERNMENT INTEREST

The invention described herein may be manufactured, used, and licensed by or for the Government without the payment of any royalties thereon.

FIELD OF INVENTION

This invention relates to the decontamination of denitrated nitrocellulose or related nitrate ester.

More particularly, this invention relates to an enzymatic process for the removal of nitrite ions from a contaminated lot of denitrated nitrocellulose, diethyleneglycol denitrate, or other nitrate ester.

BACKGROUND OF INVENTION

The process of the present invention solves the problem of removal of inorganic nitrite ions from aqueous solutions which result from the manufacture or disposal of nitrocellulose or other nitrate ester. The problem is brought about where there is chemical or enzymatic denitration of a nitrate ester resulting in the release of nitrite ions to an aqueous solution.

The disposal of nitrocellulose scrap has been dealt with in the past by burning the scrap in air, or by alkaline hydrolysis of the scrap followed by microbial utilization of the degradation products. Burning results in air pollution, and as a result is illegal in a great many locations. There are other procedures which have been described to modify nitrocellulose by removal of the nitrate ester group. These procedures include the application of inorganic sulfides or the treatment of the nitrocellulose polymer with inorganic hydrides.

In the process where digestion of the nitrocellulose particulate is accomplished with alkali, it is followed by two microbiological procedures. The process of the present invention described here has the advantage over that earlier one of greater control over the denitrification process. This is accomplished by the substitution of enzymes for potentially variable microbial populations.

OBJECTS

It is an object of this invention to provide an improved enzymatic process for the enzymatic removal of nitrite ions from solutions obtained from denitrated nitrocellulose, and related nitrite esters.

A further object is to provide an improved enzymatic process for the enzymatic removal of nitrite ions from the products of denitration of diethyleneglycol denitrate.

Other objects and many of the attendant advantages of the enzymatic process of this invention will become more apparent to those skilled in the art from a reading of this specification.

SPECIFIC EMBODIMENT

EXAMPLE 1

The removal of nitrite ions from solution following denitration of nitrocellulose by dithiothreitol and methyl viologen was accomplished by means of an enzymatic process for the reduction of nitrite. Initially, the enzyme nitrite reductase was obtained from Pseudomonas sp. . The latter is a specially selected soil microorganism in which the enzyme had been enduced by the careful control of nutrients and culture conditions. The enzyme was induced under facutative anaerobic conditions in a medium with sodium nitrite present as the sole nitrogen source. The sodium nitrite concentration at the time of inoculation was in the range 0.05 g/l to 0.15 g/l. It was found that higher concentrations of this nitrogen source inhibited growth of the bacterium in this culture medium. It should be noted that nitrite reductases from any microbial source such as bacteria or fungi may be used.

The bacterial cells in approximately 1 l of culture medium, (generally 48-72 hr old) were harvested by centrifugation, washed in buffer and then were disrupted. The latter was accomplished by decompression of the cells into approximately 15 ml of cold potassium phosphate buffer (0.1 M) supplemented with dithiothreitol (1 mM) and sodium ethylenediaminetetraacetic acid (1 mM). There are other extraction procedure which may be used to keep the denitrification enzyme systems entact, including the use of surfactants to remove the enzymes from the cellular components. These may all be used for the purpose of harvesting or extraction. A coenzyme such as either reduced nicotinamide adenine dinucleotide phosphate (NADPH) or reduced nicotinamide adenine dinucleotide (NADH) was added to the experimental assay tube. Furhter, the required reducing conditions were obtained by the addition of sodium dithionite to the assay vessels. It was found that at an assay temperature of 33 C (range: 25-37 C), the nitrite concentration in the aqueous buffer was lowered from 10 to 50% of the control values within a few hours time. Selection of concentrations that are optimum for the enzyme and nitrite substrate, and also purification of the enzyme systems will increase the yield of the product and shorten the reaction time interval appreciably. It will be evident to those skilled that additional cofactors may be required, depending on the microbial source of the nitrite reductase.

The effective nitrite reductases are thought to be either Reduced NADP: nitrite oxidoreductase (EC 1.6.6.4) or nitric oxide: (acceptor) oxidoreductase (EC 1.7.99.3) or a combination of both of these enzymes.

EXAMPLE 2

The enzymatic process of denitration of diethyleneglycol denitrate or a related nitrate ester results in the production of inorganic nitrite ions. The reduction of this ion is accomplished in aqueous buffered solutions by the addition of the denitrification enzyme systems along with the appropriate coenzyme and sodium dithionite as described in Example 1, above. The product of the reaction is dependent on the specific reductases present in the crude enzyme extract of the microorganism selected. Careful selection of the microbial source of the denitrification enzymes leads to formation of dinitrogen as one of the end products.

In conclusion, the enzymatic process of the present invention has all of the advantages inherent in enzymatic conversions, namely, speed of the reaction, activity at physiological temperatures, the ability in the recovery and reutilization of the enzyme and the convenience of immobilization of the enzyme. Moreover, the enzymatic nitrite reduction process is a way to shift the equilibrium of a reaction mixture further toward completion where nitrite ions interfere with denitration of a nitrate ester. Further advantages will become apparent to those skilled in the art. Comparable advantages are envisioned where enzymatic processes are also used to degrade the carbon skeleton residues produced during the chemical denitration of nitrocellulose or other nitrate ester as heretofore described.

What is claimed is:

1. An improved enzymatic process for the removal of nitrite ions from an aqueous solution resulting from the denitration of a nitrate ester comprising: introducing into an aqueous solution containing nitrite ions an enzyme nitrite reductase, said enzyme resulting from inducement under facultative anaerobic conditions of Pseudomonas sp.

2. The process of claim 1 wherein said enzyme is Reduced-NADP: nitrite oxidoreductase (E.C. 1.6.6.4).

3. The process of claim 1 wherein said enzyme is nitric oxide: (acceptor) oxidoreductase (E.C. 1.7.99.3).

4. The process of claim 1 wherein said enzyme is Reduced-NADP: nitrite oxidoreductase (E.C. 1.6.6.4) and nitric oxide: acceptor oxidoreductases (E.C. 1.7.99.3).

5. The process of claim 1 wherein about 1 mM/ml of coenzyme is added thereto, said coenzyme being reduced nicotinamide adenine dinucleotide phosphate.

6. The process of claim 1 wherein about 1 mM/ml of coenzyme is added thereto, said coenzyme being nicotinamide adenine dinucleotide.

* * * * *